3,528,845
PYROLYZATION PROCESS FOR
FORMING SILVER FILMS
Harold E. Donley, Monroeville, Pa., assignor to PPG
Industries, Inc., a corporation of Pennsylvania
No Drawing. Filed Dec. 12, 1966, Ser. No. 600,794
Int. Cl. B29d *11/00;* C03c *17/00*
U.S. Cl. 117—124                                    10 Claims

ABSTRACT OF THE DISCLOSURE

This invention relates to a method of depositing silver films on substrates. In particular, this invention relates to a pyrolytic method of depositing silver films from a liquid coating composition containing an organic silver compound. More specifically, this invention relates to a novel process and coating solution for forming transparent silver oxide films on a hot refractory substrate by contacting said substrate with a coating solution comprising: (1) a solvent, (2) an amine, and (3) an organic silver compound derived from an organic acid, said silver compound being frequently designated in the art as a silver soap, the utilization of an amine in such coating processes and compositions being heretofore unknown.

---

Silver films on various substrates have had considerable commercial importance because of their durability and specular properties. The silver plate of eating utensils is an example of a silver film on a metallic substrate. Upon refractory substrates, such as glass, the specular properties of silver films have been extremely important in the production of mirrors while a more recent development has been the utilization of transparent films of silver on glass as one means of reducing solar energy transmitted through the glass. Numerous processes have been developed to apply silver as metallic silver and/or silver oxide to various substrates. Such methods include electrolytic deposition, chemical deposition, direct cladding, vacuum deposition, and pyrolytic deposition. An example of chemical deposition may be found in U.S. Pat. 2,757,-104, while a cladding procedure may be found in U.S. Pat. 2,233,622. In U.S. Pat. 2,608,539 there is disclosed a type of pyrolytic process wherein metallic silver plates and a silicate material are physically intermixed in an organic resin for application to a glass surface, followed by firing at elevated temperatures.

Other methods of applying silver films to substrates, particularly glass substrates, are disclosed in U.S. Pat. No. 2,676,117, and U.S. Pat. No. 3,087,831. The former patent relates to the production of silver coatings by vacuum deposition techniques. The latter patent relates to a pyrolytic method of depositing transparent silver films on glass from aqueous solutions of inorganic silver compounds. Each of these patents illustrates the importance of thin silver films as solar control films for glass. However, each of the processes has disadvantages: the vacuum deposition technique is intricate and expensive while transparent films deposited from inorganic silver compounds do not adhere well to the refractory surfaces.

Various other metallic films have been successfully applied to glass and other refractory surfaces from metal soaps (metallic derivatives of organic acids); however, until the present invention, no satisfactory process for depositing silver films by the pyrolysis of organic silver compounds had been discovered. A persistent problem has been that many silver organic compounds, such as silver acetate, do not form good films when utilized in a pyrolytic process. This is especially so when transparent films are the objective.

In U.S. Pat. 3,185,586 it is disclosed that metal octanoates, especially metal-2-ethyl hexanoates, are utilized as the film-forming ingredient for producing transparent films. That patent discloses the superiority of transparent cobalt films formed by pyrolysis of cobalt-2-ethyl hexanoate to those formed from other cobalt soaps. Silver-2-ethyl hexanoate would appear to be similarly useful; however, it has been found to be extremely insoluble in organic solvents unless the solvent was heated to about 275° F. The films formed from the pyrolytic deposition of silver-2-ethyl hexanoate solutions at 275° F. solution temperature are of good quality, but the necessity of spraying such a hot solution mitigates against the commercialization of such a process.

However, it has now been discovered that a useful silver-containing film may be deposited upon a substrate, especially refractory substrates, by a pyrolytic method involving the contacting of a refractory substrate such as glass with a coating composition of (1) silver-2-ethyl hexanoate or other relatively insoluble silver soap, (2) an amine having the structure $$R_1-N-R_2$$
$$|$$
$$H$$

wherein $R_1$ and/or $R_2$ may be hydrogen or any organic moiety, and (3) an appropriate solvent, which is an organic solvent for amines soluble only in organic solvents, or water for water-soluble amines, including ammonia.

The silver films formed by pyrolysis of a silver soap such as silver 2-ethyl hexanoate are believed to be substantially metallic silver although silver oxide may be present. These films have excellent solar control properties.

This invention is particularly useful for the formation of silver films from 2-ethyl hexanoate. However, it also makes practical the formation of silver films from other relatively insoluble silver soaps of organic acids such as silver acetate, silver propionate, silver butyrate, silver valerate, silver benzoate, silver citrate, silver formate, silver oxalate, silver picrate, silver stearate, silver tartrate, silver naphthenate, silver linoresinate, silver tallate, silver linoleate, silver oleate, silver succinate, silver maleate, silver itaconate, silver phthalate, and the like. The preferred silver soaps are derived from aliphatic acids having about 2 to about 10 carbon atoms.

The invention has particular utility with silver soaps of organic acids, especially organic acids of less than about 10 carbon atoms. Silver 2-ethyl hexanoate, a prefered silver soap, has the following formula:

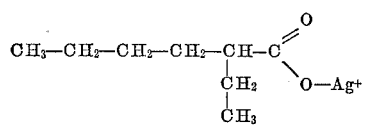

The amine compounds useful in this invention comprise those amines having an available hydrogen atom and represented by the formula

wherein $R_1$ and/or $R_2$ may be hydrogen or an organic group having less than about 10 carbon atoms, especially a hydrocarbon group such as an alkyl group, aromatic group, and cycloalkyl group, and wherein $R_1$ and $R_2$ groups may be the same or different. The alkyl amines and cycloalkyl amines, i.e., non-aromatic amines, are preferred, especially the normal monoalkyl amines having less than about 10 carbon atoms. Of the monoalkyl amines, n-hexyl amine is particularly useful.

Organic amines useful in the instant invention include:

| | |
|---|---|
| methylamine | n-hexylamine |
| dimethylamine | dihexylamine |
| ethylamine | octylamine |
| methylethylamine | cyclohexylamine |
| dipropylamine | cyclooctylamine |
| n-butylamine | aniline |
| isobutylamine | | and the like. These compounds illustrate the types of organic amines useful in this invention.

The structural formula above includes ammonia as an amine inasmuch as ammonia has been found useful and is believed to act in this environment as an amine compound. The silver soaps of organic acids, unlike silver salts of inorganic acids, do not readily ionize and are believed not to form ammonium ($NH_4^+$) complexes, complexing wtih ammonia in the same manner as an amine instead.

Ammonia and the gaseous amines may be utilized by passing the gas through an intermixture of silver soap and solvent wherein the solvent may be water or an organic solvent. The water soluble amines and ammonia may be utilized to form solutions of silver soaps in water by first dissolving the amine, e.g. ammonia, in water. The order of addition of the various ingredients necessary to form the novel coating composition of this invention is not critical.

It has been discovered that the addition of an appropriate quantity of amine, which may be referred to as a solubilizing quantity of amine, to an admixture of insoluble soap and solvent creates a sprayable, homogeneous composition believed to be a solution of a complex silver-amine compound is the solvent. This amine-silver soap-solvent composition is homogeneous and sprayable at room temperatures and eliminates the necessity of utilizing an extremely hot solution for the application of a silver coating to a hot substrate.

The quantity of amine necessary to bring about solubilization of the silver may be varied over a wide range. For any silver soap-solvent admixture it is easy to determine the proper quantity of amine by merely slowly adding the amine until a solution results, which is apparent visually. An excess of amine may be added without substantially affecting the properties of the transparent film formed by pyrolyzation of the coating solution. A deficiency of amine will result in only a portion of the silver soap becoming solubilized, thus adversely affecting film properties. A quantitative ratio of amine to silver soap can be set forth as about 0.1 mole of amine to about 2 moles of amine per mole of silver soap; however, since the solubilization is so easily detected by visual examination during addition of the amine to the silver soap-solvent mixture, it is easy to carry out the instant invention without knowledge of the exact ratio of amine to silver soap.

It has been found that the silver films formed from water solutions of amine-complexed silver soaps, including ammonia complexes, are not as aesthetically desirable as silver films formed from organic solutions. Therefore, the utilization of an organic solvent is usually preferred. Organic solvents useful in this invention include aromatic hydrocarbons, aliphatic hydrocarbons, olefinic hydrocarbons, esters of organic acids, and halogenated derivatives of aromatic, aliphatic, and olefinic hydrocarbons, said organic solvents preferably containing less than about 20 carbon atoms. The following organic compounds are representative of useful aromatic solvents:

| | |
|---|---|
| Benzene | Butyl benzene |
| Toluene | Monochloro benzene |
| Xylene | Dichloro benzene |
| Ethyl benzene | Para-bromo toluene |
| Para-propyl toluene | Monoiodo benzene | and the like. The preferred aromatic solvents are liquids at room temperature and have relatively low heats of vaporization. Since aliphatic solvents are useful in this invention as well as aromatic solvents, the organic solvents can contain any mixture of aliphatic and aromatic solvents, and the aromatic solvents may contain any number and any length of alkyl groups attached to the aromatic nuclei.

Aliphatic solvents are useful in this invention, the following being representative of such aliphatic organic compounds:

| | |
|---|---|
| Hexane | Monochloroheptane |
| Octane | Dichlorodecane |
| Decane | Monobromooctane | and the like. The aliphatic hydrocarbon solvents may contain any number of carbon atoms, for example, up to 30 carbon atoms, as long as the solvent is liquid at room temperature and possesses a relatively low heat of vaporization. The preferred aliphatic hydrocarbon solvents contain less than about 20 carbon atoms.

Another type of solvent useful in this invention is the olefinic hydrocarbon solvent. Such organic compounds may contain one or more unsaturated groups per molecule, the physical requirements of the solvents being that they are liquid at room temperature and possess a relatively low heat of vaporization. Organic compounds representative of such solvents are:

| | |
|---|---|
| Octene | Monochloroheptene |
| Decene | Dichloro-octene | and the like. Olefinic hydrocarbon solvents may contain up to 30 carbon atoms although the preferred solvents contain about 20 or less carbon atoms. Also, the olefinic solvents may be admixed in any ratio with the aliphatic or aromatic solvents.

Esters of organic acids and alcohols form another class of useful solvents. These ester solvents should contain a minimum number of free hydroxyl groups and should have a relatively low heat of vaporization and be a liquid at room temperature. Representative esters include:

Ethyl acetate
Butyl acetate
Ethyl propionate
Propyl pentanoate
Butyl hexoate
Bis (ethyl) succinate
Ethylene glycol diacetate
Ethylene glycol dipropionate
Ethylene glycol monoethyl ether acetate and the like.

Water may be used as a solvent in this invention, especially when the lower alkyl amines and ammonia are utilized as the amine complexing compound. Water, however, is not a preferred solvent because of its high heat of vaporization which detracts from the pyrolytic efficiency of the coating composition.

The temperature of the coating composition may be varied over wide ranges. One advantage of the amine-complexed silver solution of the instant invention resides in the fact that the solution need not be maintained at elevated temperatures to achieve a true solution; however, if it is desired, the coating composition may be maintained at relatively high temperatures prior to and during its application to the substrate. Maintaining the coating solutions at elevated temperatures may, in some instances, be advantageous in improving the pyrolytic efficiency of the solution. This may be desirable when the solvents being utilized are difficult to evaporate or pyrolyze or when high molecular weight amines are utilized as the complexing agent. Thus, the coating solutions may be maintained at temperatures as high as 300° F. or higher, if desired; although at such elevated temperatures precautions may be necessary to prevent undue evaporation of the solvents or amines present.

The lower temperature limits for the coating composition solution are determined by the freezing point of the solution or by the maximum viscosity appropriate for a spray process. The application of very cold coating compositions to a hot substrate may reduce the pyrolytic efficiency of the process; however, if this is not of importance then cold coating solutions may be applied. As stated above, one of the prime advantages of the instant invention resides in the achievement of a true solution of the silver organic compounds at low temperature thereby enabling application of a low temperature solution to a hot substrate.

The substrate should be maintained at relatively high temperatures, that is, in the order of 1000° F., although lower temperatures may be utilized, especially when the coating solution has a very high pyrolytic efficiency. Temperatures as low as about 600° F. may be utilized when the solution has a very high pyrolytic efficiency; however, a preferred minimum temperature is above about 800° F. The substrate is preferably maintained at relatively high temperatures in order to quickly vaporize the organic solvent and rapidly pyrolyze the organic portions of the amine-silver organic compound complex. If pyrolyzation occurs very slowly, the resulting film may be mottled and hazy. Also, when the substrate is maintained at relatively high temperatures, the coating solution may be applied at a faster rate, therefore providing a more efficient process.

The upper temperature limit for the process of this invention is a function of the physical characteristic of the substrate, that is, degradation of the substrate should be avoided. The temperature of the substrate should not be so high, however, as to cause vaporization and pyrolyzation of the coating solution before the solution contacts the substrate. Since very efficient film formation occurs at about 1200° F. to about 1400° F., it is seldom that higher temperatures are required. In coating glass, for example, the glass temperature seldom exceeds about 1200° F. to about 1300° F. and is usually in the range of about 800° F. to about 1100° F.

The concentration of silver in the coating solution is largely determined by the acceptable viscosity of the solution and practical rates of film formation. It has been found that concentrations of about 0.2 percent by weight to about 28.0 percent by weight of silver in the coating composition represents a practical limit; the coating composition being comprised of a silver soap, for example, silver-2-ethyl hexanoate, amine and solvent. At the lower silver concentrations the film formation upon the substrate is rather slow. While a coating solution containing as little as 0.2 percent by weight of silver forms acceptable films, a more commercially practical lower limit is about 0.5 percent by weight and it is preferred that the silver solution contain at least about 1.0 percent by weight of silver. The upper concentration of silver in the solution is determined largely by the viscosity of the solution. Many of the amine-silver octanoate complexes contain about 30.0 percent by weight of silver and it is necessary to add some solvent to achieve a sprayable solution when the film is to be formed by spray techniques. Solutions containing about 28.0 percent by weight silver have been found to be sprayable.

The formation of useful silver films from an amine complex is surprising inasmuch as amines are usually detrimental to good film formation because of the strong coordinate bond formed between the amine and the silver compound. However, it has been found that the amine-silver soap complexes, particularly amine-octanoate complexes, do form good films upon pyrolyzation, especially when the amine is an alkyl amine or ammonia. The aromatic amines, alkanol amines, and cycloalkyl amines are likewise useful in this invention; however, their pyrolytic efficiency is less than that of the alkyl amines.

Pyrolytic efficiency is a term used herein to define the over-all film formation characteristics of the coating composition and is dependent upon a number of factors including the temperature of the solution, the temperature of the substrate, the heat of vaporization of the solvent, and the character of the amine which is determined in part by the molecular weight of amine and the strength of the bond formed between the amine and the silver compound. The higher the pyrolytic efficiency of a solution, the faster it may be applied to a hot substrate, thereby resulting in faster film formation and reduced film mottleness, texture, and haze.

Another advantage of the instant invention resides in the fact that the coating compositions are stable. Most silver solutions must be protected from light to prevent the precipitation of elemental silver from the solution. However, it has been discovered that the amine complexed silver octanoate solutions of this invention have excellent storage stability without precautions to prevent exposure to light. This is especially important when the solutions are to be used in commercial applications of silver films inasmuch as it eliminates the necessity of special storage precautions and special handling.

The coating compositions of the instant invention are preferably applied to a substrate by spray techniques although other methods such as roll coating, dipping, and the like, may be utilized. The substrate, as discussed above, is maintained at an elevated temperature in order to provide the energy necessary to pyrolyze and vaporize the coating composition in order to form the silver oxide film. When glass is utilized as the substrate, the elevated temperature should exceed the strain point of the glass in order to reduce strain and eliminate breakage caused by the contact of the relatively cold coating solution upon the surface. The substrate, therefore, must be capable of withstanding temperatures in the range of about 700° F. to about 1400° F. The substrate should preferably be oxidation resistant at these temperatures in order to provide an adherent silver film. It is evident, therefore, that refractory bases are more useful than oxidizable metallic substrates, the preferred refractory substrate being glass.

Practically any commercial glass may be utilized as a substrate for applying the coating composition of the instant invention. For example, typical commercial glasses such as the soda-lime-silicate glasses, boro-silicate glasses, boro-alumina-silicate glasses, lead-alkali-silicate glasses, aluminosilicate glasses, and the like may be utilized. These glasses may be clear, colored, photosensitive, or heat absorbing.

The glass utilized in the following examples is a typical soda-lime-silica glass having the following composition:

| Ingredient | Weight percent range |
|---|---|
| $SiO_2$ | 60–75 |
| $Na_2O$ | 5–17 |
| $K_2O$ | 0–10 |
| $K_2O + Na_2O$ | 10–17 |
| CaO | 5–15 |
| MgO | 0–7 |
| CaO + MgO | 0–15 |

The following examples illustrate specific embodiments of the instant invention. The examples are not to be construed as limiting the invention, however, for the invention includes all the variations and modifications set forth hereinabove.

EXAMPLE I

Amine-toluene-silver 2-ethyl hexanoate solutions

This example illustrates the excellent solubility of silver 2-ethyl hexanoate in toluene when a primary or secondary amine is present.

| Solution No. | Amine (type) | Amine (ml.) | Solubility | Quality of film |
|---|---|---|---|---|
| 1 | Monoethanolamine | 1.5 | Good | Fair. |
| 2 | n-Hexylamine | 5.0 | do | Excellent. |
| 3 | 2-ethylhexylamine | 8.0 | do | Fair. |
| 4 | Diethylenetriamine | 2.0 | do | Do. |

The above solutions were prepared by adding the amine to a mixture of 40 grams of toluene and 10 grams of silver 2-ethyl hexanoate. (The silver 2-ethyl hexanoate utilized in this example was dissolved in hexanoic acid forming a viscous solution containing 28.0 percent by weight of Ag. Therefore, all of the above solutions contained about 5.6 percent by weight of silver.)

All of the above solutions were heated slightly: however, as later examples will illustrate, heating is unnecessary.

The film from Solution No. 2 formed rapidly when sprayed on glass having a temperature of about 1050° F. This film was substantially free from mottle and other optical defects. The other solutions formed films less rapidly and the films were slightly mottled.

Similar results are obtained whenever benzene or xylene is substituted for toluene in the above solutions.

Silver Solution No. 2 (n-hexylamine) was stored for about three months in a clear glass bottle without evidencing any signs of deterioration.

Similar results are obtained whenever silver acetate is substituted for silver 2-ethyl hexanoate in the above solutions.

EXAMPLE II

Solubilizing solid silver 2-ethyl hexanoate

About 10 grams of solid silver 2-ethyl hexanoate (40.85 percent by weight silver) were dissolved in 40 grams of toluene with the aid of 5 milliliters of n-hexylamine to form a solution containing 7.5 percent by weight silver. No heat was necessary to aid solubility of the silver compound.

An excellent silver film was formed very rapidly when the solution was sprayed upon a glass substrate having a temperature of about 1050° F.

EXAMPLE III

Solubilizing of silver 2-ethyl hexanoate with ammonia

Part A—Water solution.—Ammonia, as concentrated ammonium hydroxide (12 milliliters), was utilized to rapidly dissolve 10 grams of solid silver 2-ethyl hexanoate in 35 grams of water. The solution had a silver concentration of about 7.5 percent by weight.

Film formation was rapid when the above solution was sprayed upon a glass sheet heated to a temperature of about 1100° F. The resulting film had good optical properties.

Part B—Toluene solution.—To demonstrate that the $NH_4^+$ (ammonium ion) is not the complexing agent, gaseous ammonia was bubbled through a mixture of 5 grams of silver 2-ethyl hexanoate and 35 milliliters of toluene. Because of the limited solubility of ammonia in toluene, a total of 2.5 grams of silver 2-ethyl hexanoate were dissolved.

An amber solution was formed which appeared identical in color to solutions of n-hexylamine, silver 2-ethyl hexanoate, and toluene. The solution rapidly formed an optically good film when sprayed upon a glass substrate under pyrolyzing conditions.

Part C—Methanol solution.—Ammonia gas was bubbled through a suspension of 5 grams of Ag. 2-ethyl hexanoate and 35 milliliters of methanol. Ammonia solubility in methanol is greater than in toluene and 5 grams of silver 2-ethyl hexanoate were dissolved.

The resulting solution was clear in color and appeared identical to the ammonium hydroxide solution of Part A above. An excellent transparent film was rapidly formed when this solution was sprayed upon a glass surface having a temperature of about 1100° F.

Although specific embodiments of the invention have been set forth hereinabove, the invention is not to be limited thereto, but to include all features falling within the scope of the following claims.

I claim:
1. A process for forming a transparent silver-containing film on an oxidation-resistant substrate comprising contacting said substrate under pyrolyzing conditions wherein the substrate is at a temperature of about 800° F. to about 1400° F. with a sprayable coating solution, consisting essentially of
    (a) about 0.2 to about 28% by weight of silver present as a silver soap of an organic acid having about 2 to about 10 carbon atoms,
    (b) an amine having the structure

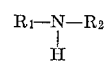

wherein $R_1$ and $R_2$ are selected from the class consisting of hydrogen and an organic moiety of less than about 10 carbon atoms, and
    (c) a solvent,
wherein the quantity of said amine is sufficient to solubilize said silver soap in said solvent.

2. The process of claim 1 wherein the silver soap is silver 2-ethyl hexanoate.

3. The process of claim 1 wherein the amine is a cycloalkyl amine.

4. The process of claim 1 wherein the amine is an alkyl amine.

5. The process of claim 4 wherein the amine is n-hexylamine.

6. The process of claim 3 wherein the amine is ammonia.

7. The process of claim 1 wherein the solvent is an organic solvent.

8. The process of claim 6 wherein the solvent is water.

9. The process of claim 1 wherein amine is present in an excess over the quantity required to achieve solubilization of the silver soap in the solvent.

10. The process of claim 4 wherein the alkyl amine is a normal mono-alkyl amine having less than 10 carbon atoms.

References Cited

UNITED STATES PATENTS

| | | | |
|---|---|---|---|
| 3,087,831 | 4/1963 | Browne | 117—35 |
| 3,185,586 | 5/1965 | Saunders et al. | 117—54 |
| 3,262,790 | 7/1966 | Fitch | 106—1 |
| 3,383,247 | 5/1968 | Adlhart et al. | 106—1 XR |

JULIUS FROME, Primary Examiner

L. B. HAYES, Assistant Examiner

U.S. Cl. X.R.

106—1; 117—33.3, 54, 169